United States Patent [19]
Kitsuki

[11] Patent Number: 5,828,785
[45] Date of Patent: Oct. 27, 1998

[54] METHOD OF REDUCING THE NUMBER OF ACCESS TIMES TO A REFERENCE FRAME MEMORY IN IMAGE COMPRESSION

[75] Inventor: Toshiaki Kitsuki, Tokyo, Japan

[73] Assignee: NEC Corporation, Tokyo, Japan

[21] Appl. No.: 518,224

[22] Filed: Aug. 23, 1995

[30] Foreign Application Priority Data

Aug. 23, 1994 [JP] Japan ................................ 6-219571

[51] Int. Cl.[6] .............................. G06K 9/36; H04N 7/12
[52] U.S. Cl. .......................... 382/232; 382/236; 348/402; 348/416
[58] Field of Search ................................... 382/236, 232; 348/390, 402, 412, 415, 420, 430, 431, 416

[56] References Cited

U.S. PATENT DOCUMENTS

| | | | |
|---|---|---|---|
| 5,142,361 | 8/1992 | Tayama et al. | 348/416 |
| 5,400,087 | 3/1995 | Uramoto et al. | 348/402 |
| 5,594,813 | 1/1997 | Fandrianto et al. | 382/236 |

FOREIGN PATENT DOCUMENTS

| | | | |
|---|---|---|---|
| 43 07 936 A 1 | 4/1992 | Germany | G06F 15/62 |
| 385884 | 4/1991 | Japan | H04N 7/13 |
| 453389 | 2/1992 | Japan | H04N 11/04 |

OTHER PUBLICATIONS

Image and Video Coding Standards, Aravind et al, "AT&T Technical Journal", Jan./Feb. 1993, pp. 67–89.
European Search Report.

Primary Examiner—David K. Moore
Assistant Examiner—Wenpeng Chen
Attorney, Agent, or Firm—Whitham, Curtis & Whitham

[57] ABSTRACT

A search window of data blocks of a reference (viz., previous) frame is established in a search window memory for preparation for estimating displacement of a current data block of a current picture frame within the search window. The search window memory has memory capacity of two times that of the search window. The current picture frame is divided, in horizontal and vertical directions, into a plurality of data blocks which are sequentially written in a current block memory along each of horizontal lines according to a predetermined order of horizontal lines. A reference frame memory is accessed for writing data blocks in the search window memory for completing a search window for a current data block for preparing a part of a search window for a data block located on a horizontal line next to said given horizontal line when the current data block belongs to one of a predetermined number of last data blocks on said given horizontal line. On the other hand, the reference frame memory is accessed for writing data blocks in the search window memory for completing a search window for the current data block when the current data is located on the given horizontal line and outside of the predetermined number of last data blocks.

4 Claims, 15 Drawing Sheets

FIG. 15

|  | A0 | A1 | A2 | A3 | B0 | B1 |
|---|---|---|---|---|---|---|
|  | W | R | R | R |  |  |
| (7,5) | (9,4) | (6,4) | (7,4) | (8,4) | * | * |
|  | (9,5) | (6,5) | (7,5) | (8,5) | * | * |
|  | (9,6) | (6,6) | (7,6) | (8,6) | * | * |
|  | R | W | R | R | W |  |
| (8,5) | (9,4) | (10,4) | (7,4) | (8,4) | (10,2) | * |
|  | (9,5) | (10,5) | (7,5) | (8,5) | (10,3) | * |
|  | (9,6) | (10,6) | (7,6) | (8,6) | (10,4) | * |
|  | R | R | W | R |  | W |
| (9,5) | (9,4) | (10,4) | (11,4) | (8,4) | (10,2) | (11,2) |
|  | (9,5) | (10,5) | (11,5) | (8,5) | (10,3) | (11,3) |
|  | (9,6) | (10,6) | (11,6) | (8,6) | (10,4) | (11,4) |
|  | R | R | R | W |  |  |
| (10,5) | (9,4) | (10,4) | (11,4) | (12,2) | (10,2) | (11,2) |
|  | (9,5) | (10,5) | (11,5) | (12,3) | (10,3) | (11,3) |
|  | (9,6) | (10,6) | (11,6) | (12,4) | (10,4) | (11,4) |
|  | W |  | R |  | R | R |
| (11,3) | (13,2) | (10,4) | (11,4) | (12,2) | (10,2) | (11,2) |
|  | (13,3) | (10,5) | (11,5) | (12,3) | (10,3) | (11,3) |
|  | (13,4) | (10,6) | (11,6) | (12,4) | (10,4) | (11,4) |
|  | R | W | R |  |  | R |
| (12,3) | (13,2) | (14,2) | (11,4) | (12,2) | (10,2) | (11,2) |
|  | (13,3) | (14,3) | (11,5) | (12,3) | (10,3) | (11,3) |
|  | (13,4) | (14,4) | (11,6) | (12,4) | (10,4) | (11,4) |

METHOD OF REDUCING THE NUMBER OF ACCESS TIMES TO A REFERENCE FRAME MEMORY IN IMAGE COMPRESSION

BACKGROUND OF THE INVENTION

1. Field of the Invention

The present invention relates generally to a method of improving motion picture data processing, and more specifically to a method of effectively reducing the number of access times to a reference frame memory before implementing motion vector determination. Still more specifically, the present invention relates to a method of writing clustered image data forming part of a previously processed picture frame into a search window memory which is accessed for motion vector determination. The present invention is well suited to dealing with sequential frame imagery of the H.261 standard of the CCITT (the Consultative Committee of the International Telephone and Telegraph).

2. Description of the Related Art

Ever since the advent of modern digital computation, there has been a need for image compression. As is known in the art, one of the currently adopted standards for compression of sequential frame imagery is the H.261 standard of the CCITT. The H.261 standard is intended for video teleconferencing applications. An additional standard, called MPEG, is being developed by the Motion Picture Experts Group of the CCITT and ISO (the International Standardization Organization). Image compression techniques use common preprocessing facilities such as predictive coding, motion compensation, etc.

Interframe predictive coding improves compression through statistical redundancy. Based on the pixel values of a portion of the frame previously encoded, an encoder can estimate or predict the values of the corresponding portion of the next (viz., current) frame yet to be encoded, requiring only the difference between the predicted and actual values to be encoded. The difference value is the prediction error which is encoded and sent to a destination instead of the actual values. The prediction error is used at a receiver (viz., decoder) to correct the prediction.

Motion compensated interframe predictive coding detects a motion vector indicative of displacement between a block of a current frame and the corresponding block of the previous frame. The previous frame's block is then moved along the motion vector to produce a predictive error indicating spacial difference between the two blocks of the current and previous frames. Since the present invention is concerned with the processing prior to detecting a motion vector, the further description of the motion vector is deemed redundant.

Before describing the present invention, it is deemed advantageous to briefly discuss, with reference to FIGS. 1–4, the picture frame format according to the H.216 standard.

FIG. 1 is an illustration showing the division of a picture frame according to the H.216 standard. As shown, a frame of 352-pixel by 288-line is first partitioned into 12 groups, called GOBs (groups of macroblocks), each of which is then subdivided into 36 (=3×12) macroblocks. Thus, each GOB is 176-pixel by 48-line, while each macroblock (hereinafter sometimes referred to merely as a block) is 16-pixel by 16-line. The blocks of each GOB are successively processed for determining motion vectors, from left to right, top to bottom, in the GOB's numerical order.

FIG. 2 is a diagram showing one picture frame wherein all the blocks totalling 396 (=22×18) are illustrated together with a plurality of arrows indicating the order of successive processing of the blocks. Throughout the instant disclosure, merely for the convenience of description, the location of each block in the frame is defined by a pair of column and row numbers shown in FIG. 2. That is, the blocks in the top line are specified by (0,0), (1,0), (2,0), . . . , (20,0), and (21,0), while the blocks of the second line from the top are defined by (0,1), (1,1), (2,1), . . . , (20,1), and (21,1), etc.

As mentioned above, the blocks of each GOB are processed from left to right and top to bottom, and the GOBs are processed in the order of the numerals attached thereto, Thus, after the block (10,0) in the GOB 0 is processed, the next block to be processed is the block (0,1) on the second row. Further, after the last block (10,2) of the GOB 0 is processed, the first block (11,0) of the GOB 1 is processed.

FIG. 3 is a sketch schematically showing a known motion vector determination technique. A block under processing within a current block is called a current block. Before determining a motion vector of the current block, a search window is picked up or obtained from a reference frame (viz., the previously encoded frame). Following this, it is determined, by way of block matching techniques, which region of 16-pixel by 16-line in the search window most closely resembles the current block. Thus, by determining the spacial displacement from the current block to the above mentioned most resembling region, a motion vector of the current block to the region is detected.

FIG. 4 is a block diagram schematically showing one example of an arrangement for detecting motion vectors.

The arrangement of FIG. 4 includes a controller 20 for controlling the overall operations of blocks of FIG. 4, a current block memory 22, a search window memory 24, a reference frame memory 26, a reference frame controller 28, and a motion vector calculator 30, all of which are operationally coupled as illustrated. The motion vector calculator 30 requires a plurality of access times to both a current block and a search window until completing the detection of one motion vector. In order to effectively implement such access by the motion vector calculator 30, the current block memory 22 and the search window memory 24 are provided and thus serve as buffers for temporarily storing the pixel data to be processed by the motion vector calculator 30.

The reference frame (viz., previous frame) is sent to the reference frame memory 26, via a video bus 21, from external circuitry (not shown). The writing of the reference frame into the memory 26 is controlled by the reference frame controller 28. On the other hand, current blocks are sent, on a one-by-one basis, to the current block memory 22, while the corresponding search windows are successively applied to the search window memory 24 from the reference frame memory 26. Throughout the instant disclosure, it is assumed that the search window includes 3×3 blocks whose center block corresponds to the current block. It is to be noted that the size of the search window is not limited to 9 (=3×3) blocks and may be N×N where N equals 3 or an odd integer more than 3.

After the memories 22 and 24 have respectively stored the current block and the corresponding search window, the motion vector calculator 30 begins detecting the motion vector in a manner well known in the art.

As mentioned above, the search window includes 3×3 blocks whose center block corresponds to the current block. Thus, in the case where the block (9,5) is the current block (see FIG. 2), the search window memory 24 stores the following 9 blocks of the reference (viz., previous) frame:

(8,4), (9,4), (10,4)
(8,5), (9.5), (10,5)
(8,6), (9,6), (10,6)
wherein the underlined block corresponds to the current block. When the next current block (10,5) is to be processed, the search window memory 24 in turns stores the following 9 blocks of the reference frame:
(9,4), (10,4), (11,4)
(9,5), (10.5), (11,5)
(9,6), (10,6), (11,6)
In this instance, it is understood that the blocks (9,4), (9,5), (9,6), (10,4), (10,5), and (10,6) have already been stored in the search window memory 24. Accordingly, it is sufficient if only the three new blocks (11,4), (11,5), and (11,6) are added to the search window memory 24 from the reference frame memory 26.

However, when the next block (11,3) (viz., the first block of the GOB 1) is to be processed, the search window memory 24 has to store the following 9 blocks of the reference frame:
(10,2), (11,2), (12,2)
(10,3), (11,3), (12,3)
(10,4), (11,4), (12,4)
It is understood that the blocks (10,4), (10,5), (10,6), (11,4), (11,5), and (11,6), which have been stored for the preceding current block (10,5), are not available to the current block (11,3). Accordingly, it is no longer possible to follow the above mentioned supplementation of the three new blocks from the reference frame memory 26.

Therefore, according to a conventional method, every time a new current block is input to the current block memory 22, all the nine (9) blocks of the reference frame for establishing the corresponding search window are read out of the reference frame memory 26 and stored in the search window memory 24 within a single operation time period prior to one motion vector determination cycle. This means that the number of access times for data read from the reference window memory 24 becomes undesirably large. Accordingly, each of the memories 24 and 26 needs to operate at a comparatively high speed and thus invites high costs. Still further, the above mentioned conventional method has encountered another problem that the read access to the reference frame memory must be suspended while the motion vector calculator 30 accesses the search window memory 24 for the motion vector determination.

In order to eliminate the idle time caused by the suspended read access to the memory 26, it is conceivable to provide two memory sections in the search window memory 24 for alternately storing the whole search window. That is, while one memory section of the memory 24 is accessed by the motion vector calculator 30, the other memory section of the memory 24 stores the whole next search window. On the other hand, the current block memory 22 has to store two consecutive current blocks in order to meet the alternate storing of the two search window data in the memory 24.

The alternate data writing of the whole search window into two memory sections is suggested by the Japanese Laid-open Patent Application No. 3-85884. Another reference similar to the above is the Japanese Laid-open Patent Application No. 4-53389. However, the aforementioned problem that the entire search window data should be read from at a time (or during a single operation cycle) from the reference frame memory has not yet been overcome.

What is desired is an improved method of effectively writing the search window data into the search window memory in order to markedly decrease the number of access times to the reference frame memory.

SUMMARY OF THE INVENTION

It is an object of the present invention is to provide a method of improving the efficiency of motion vector determination in image compression.

Another object of the present invention is to provide a method of effectively reducing the number of access times to a reference frame memory for reading a search window data.

One aspect of the present invention resides in a method of reading a plurality of data blocks of a reference picture frame stored in a first memory and establishing a search window of N×N (N equals 3 or an odd integer more than 3) data blocks of said reference picture frame in a second memory, said search window being used for estimating displacement of a current data block of a current picture frame within said search window, said second memory having memory capacity of 2×N×N data blocks, said current data block being stored in a third memory, said current picture frame being divided, in horizontal and vertical directions, into a plurality of data blocks which are sequentially written in said third memory along each of horizontal lines according to a predetermined order of horizontal lines, said method comprising the steps of: (a) accessing said first memory and writing 1×N data blocks in said second memory for completing a search window for a current data block on a given horizontal line and further accessing said first memory and writing another 1×N data blocks for preparing a pert of a search window for a data block located on a horizontal line next to said given horizontal line when said current data block belongs to one of a predetermined number of last data blocks on said given horizontal line; and (b) accessing said first memory and writing 1×N data blocks for completing a search window for said current data block when said current data is located on said given horizontal line and outside of said predetermined number of last data blocks.

Another aspect of the present invention resides in a method of reading a plurality of data blocks of a reference picture frame stored in a first memory and establishing a search window of N×N (N equals 3 or an odd integer more than 3) data blocks of said reference picture frame in a second memory, said search window being used for estimating displacement of a current data block of a current picture frame within said search window, said second memory having memory capacity of 2×N×N data blocks, said current data block being stored in a third memory, said current picture frame being divided, in horizontal and vertical directions, into a plurality of data blocks which are sequentially written in said third memory along each of horizontal lines according to a predetermined order of horizontal lines, said method comprising the steps of: (a) accessing said first memory and writing 1×N data blocks in said second memory for preparing a part of each of two search windows for respective data blocks to be processed when said current data block belongs to one of a predetermined number of last data blocks on said given horizontal line; and (b) accessing said first memory and writing 1×N data blocks for preparing a search window for a data block to be processed when said current data is located on said given horizontal line and outside of said predetermined number of last data blocks.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 15 is a diagram showing how search windows for respective current blocks are established in accordance with the second embodiment.

DETAILED DESCRIPTION OF THE PREFERRED EMBODIMENTS

The present invention resides in a method via which the search window data can be stored in a search window memory without requiring the large number of access times needed in the conventional method.

A first embodiment of the present invention will be discussed with reference to FIGS. 5–13.

Figure 4:
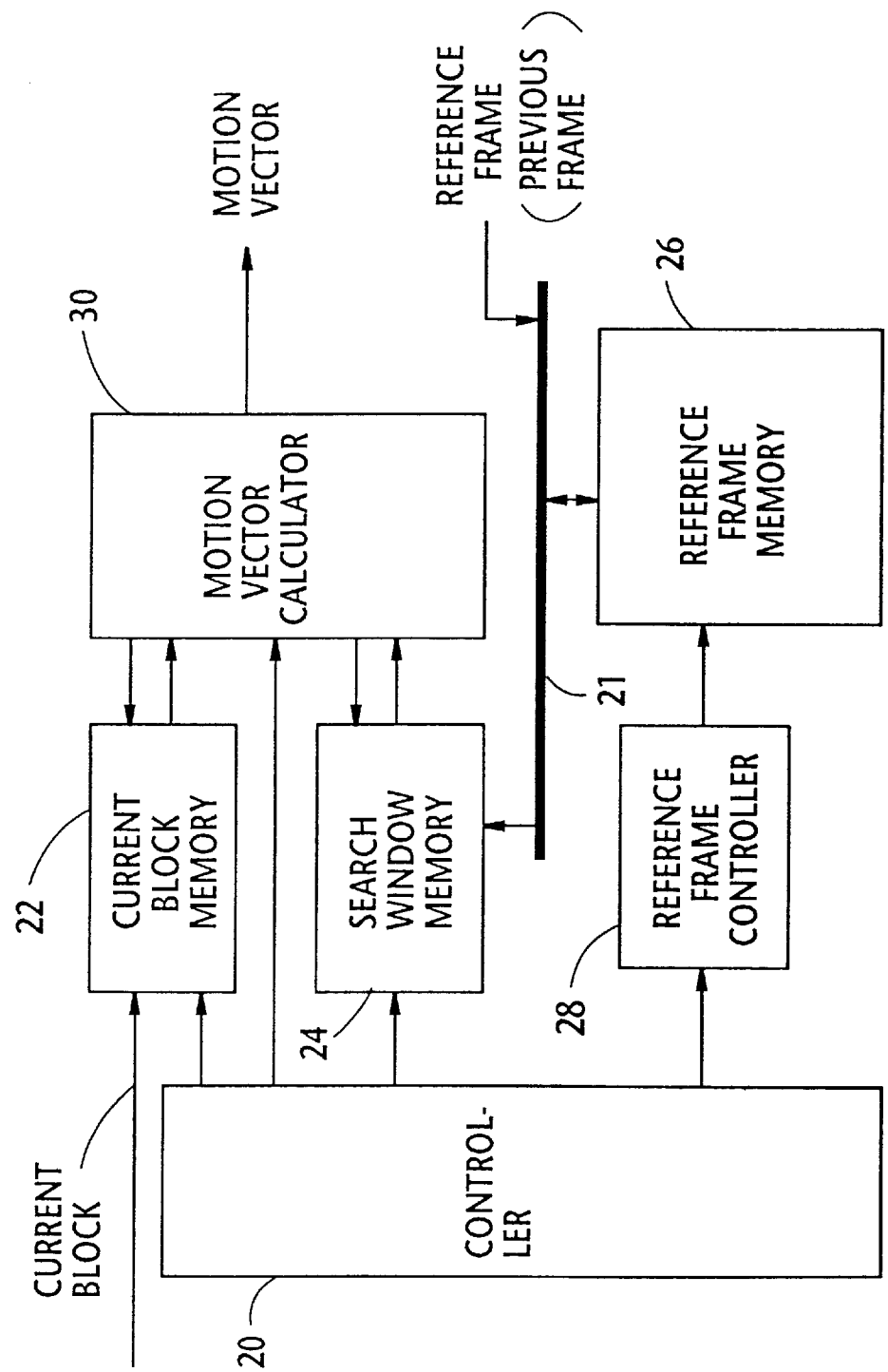
FIG. 4 is a block diagram showing a known arrangement for detecting motion vectors.
Figure 5:
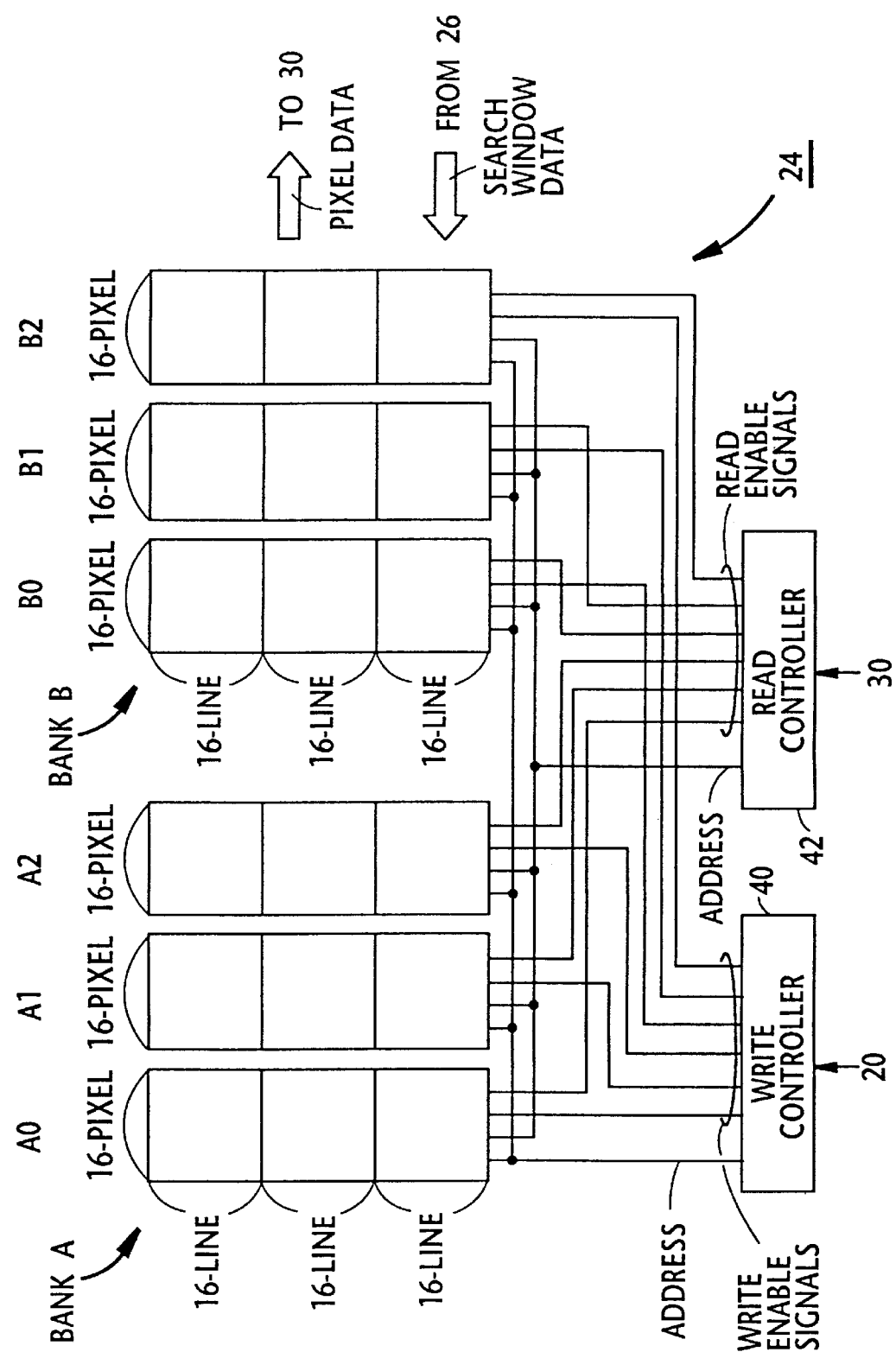
FIG. 5 is a block diagram showing details of a part of FIG. 4, which is used for implementing a first embodiment of the present invention.

FIG. 5 is a block diagram showing a search window memory for implementing the first embodiment of the present invention. The search window of FIG. 5 corresponds to the memory 24 of FIG. 4 and thus is denoted by the same numeral.

As shown in FIG. 5, the search window memory 24 generally includes two memory banks A and B, a write controller 40, and a read controller 42. The memory bank A includes three memory sections A0, A1, and A2, while the memory bank B includes three memory sections B0, B1, and B2. Each of the memory section A0–A2 and B0–B2 is divided into three memory portions (no numeral) each storing one block of 16-pixel by 16-line. As will be understood as the description proceeds, the pixel data which form a search window and which are stored in the memory bank A or B, are accessed by the motion vector calculator 30 (FIG. 4) for motion vector determination.

The write controller 40 selectively supplies the memory sections A0–A2 and B0–B2 with both write enable signals and write addresses such as to write search window data applied from the reference frame memory 26 (FIG. 4) into an appropriate memory section selected among A0–A2 and B0–B2.

Likewise, the read controller 42 selectively supplies one of the memory banks A and B with both read enable signals and read addresses in response to the access signals from the motion vector calculator 30. The search window data thus read out are applied to the calculator 30. The read/write control of the memory sections A0–A2 and B0–B2 by the controllers 40 and 42 are well known in the art and thus, further descriptions thereof are omitted for the sake for simplifying the disclosure.

Figure 1:
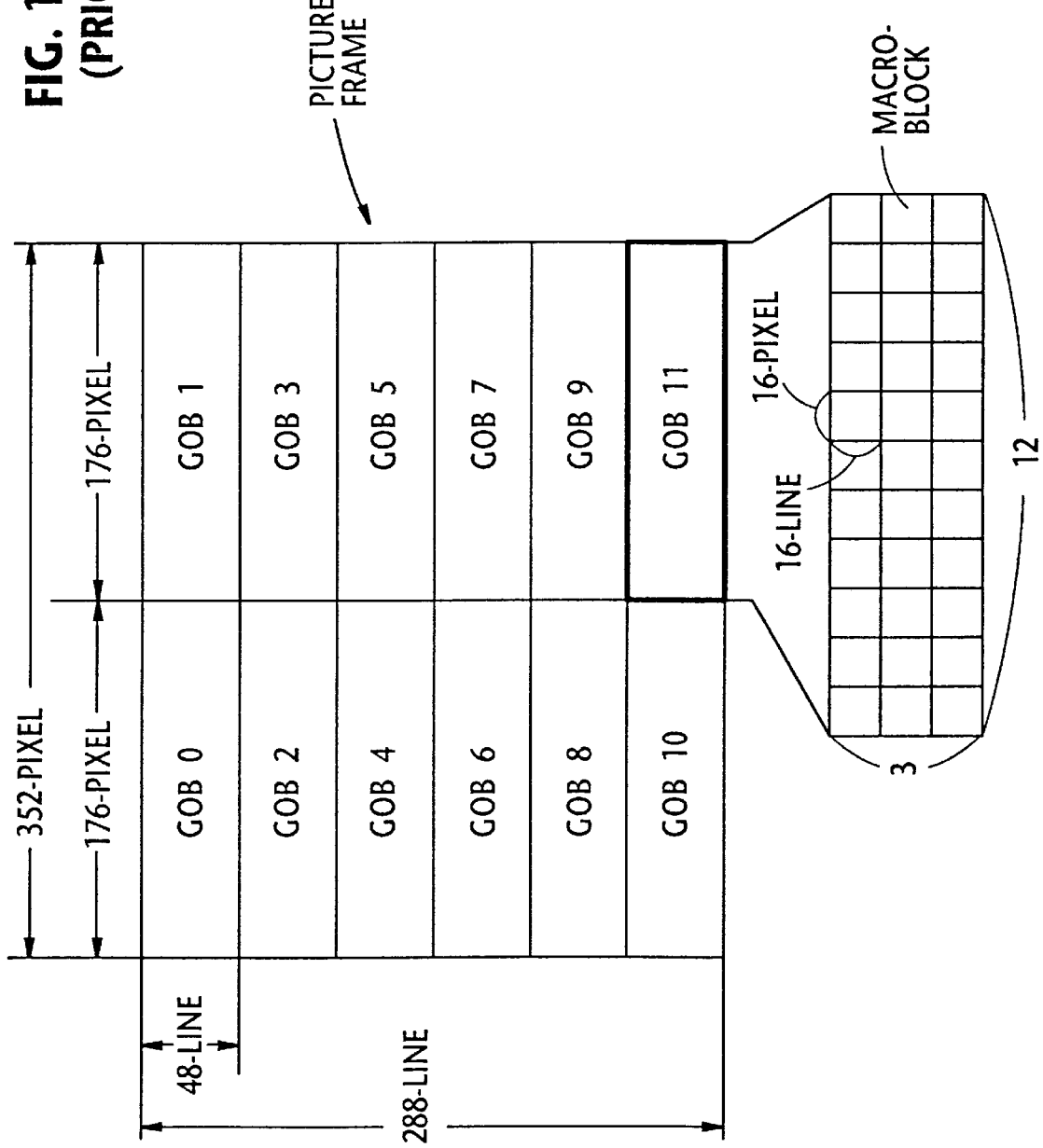
FIG. 1 is an illustration showing the division of a picture frame according to the H.216 standard of the CCITT.
Figure 2:
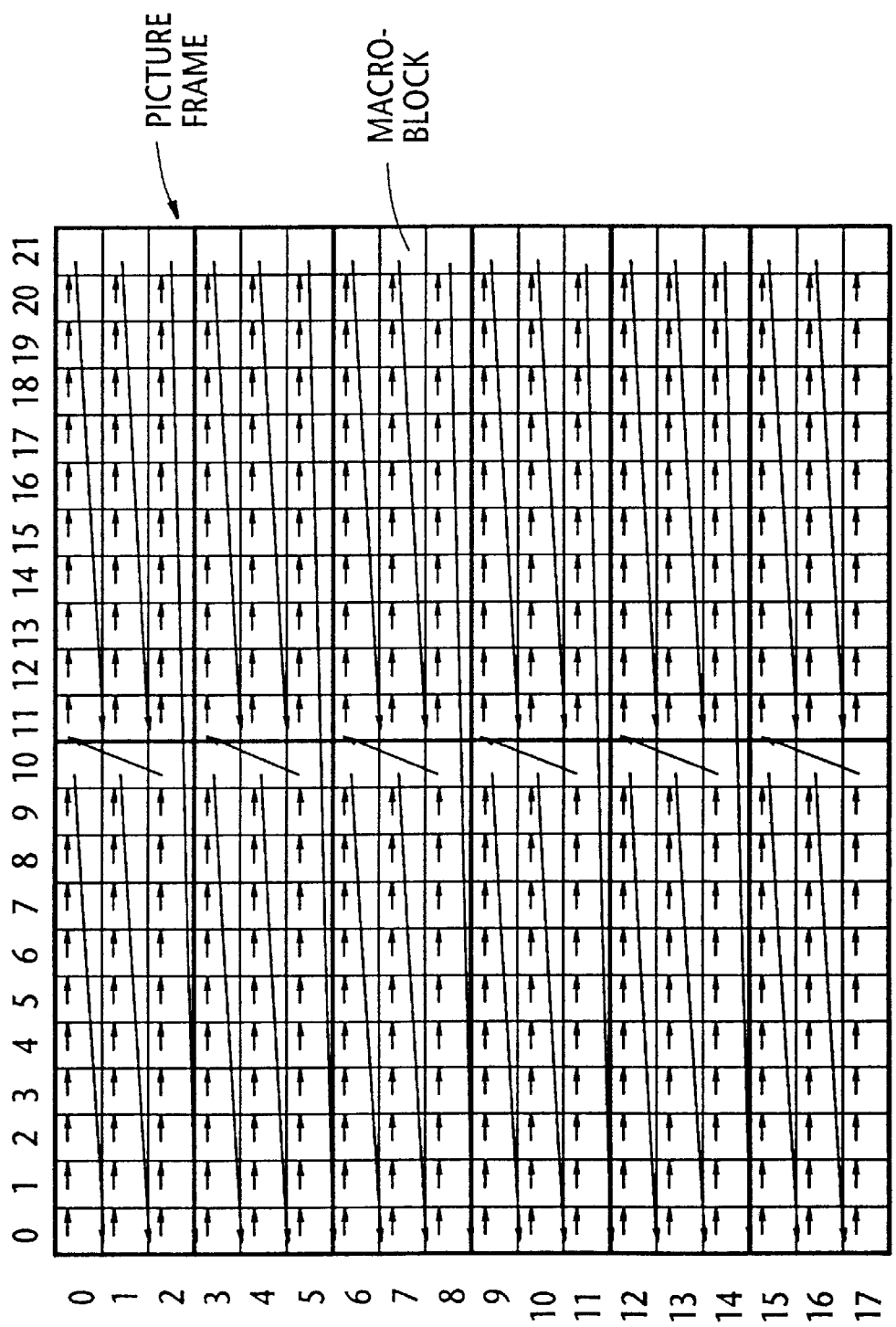
FIG. 2 is a diagram showing a picture frame wherein all the blocks totalling 396 (=22×18) are illustrated together with a plurality of arrows indicating the order in which successive processing of the blocks is carried out in accordance with the H.216.
Figure 3:
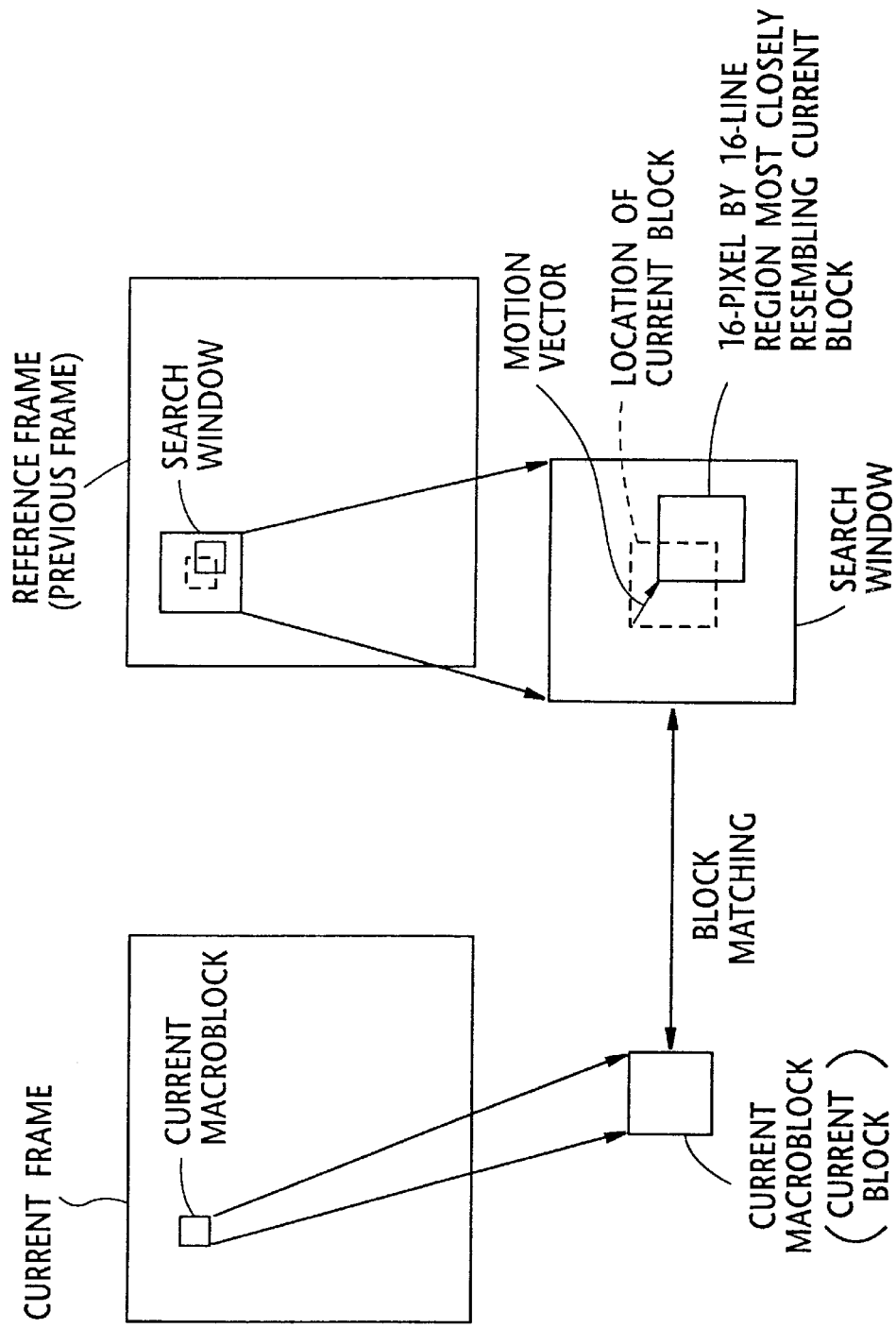
FIG. 3 is a sketch schematically showing a known a motion vector determination technique.
Figure 6:
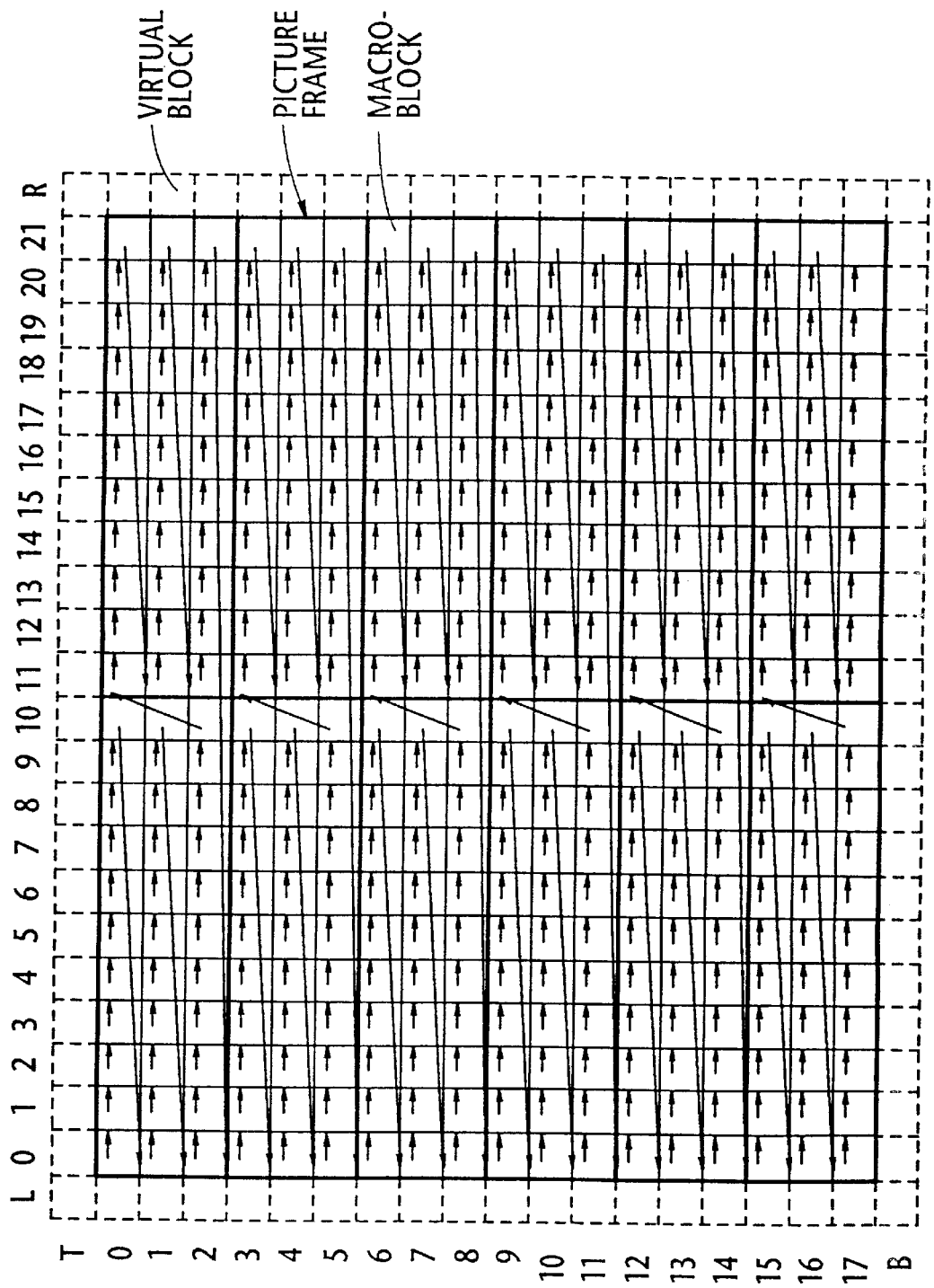
FIG. 6 is a diagram showing a picture frame and a plurality of virtual blocks surrounding the frame according to the present invention.

FIG. 6 is a diagram showing a picture frame and a plurality of virtual blocks which surround the frame. The picture frame is identical to that shown in FIG. 2. The virtual blocks are represented by dashed lines and are classified as "top", "left", "right", and "bottom" blocks for the purpose of convenience. More specifically, the "top virtual blocks" are the blocks defined by (L,T), (0,T), (1,T), . . . , (21,T), and (R,T). The "left virtual blocks" are the blocks defined by (L,0), (L,1), . . . , and (L,17). The "right virtual blocks" are the blocks defined by (R,0), (R,1), . . . , and (R,17). Finally, the "bottom virtual blocks" are the blocks defined by (L,B), (0,B), (1,B), . . . , (21,B), and (R,B).

The virtual blocks are provided for the convenience of automatically implementing routine procedures according to the present invention and thus are allocated respective addresses for access. The content of each virtual block is uncertain (may be merely noise) so that the motion vector calculator 30 neglects the virtual blocks. As mentioned later, the virtual blocks are not essential to the instant invention and can be omitted.

Figure 7:
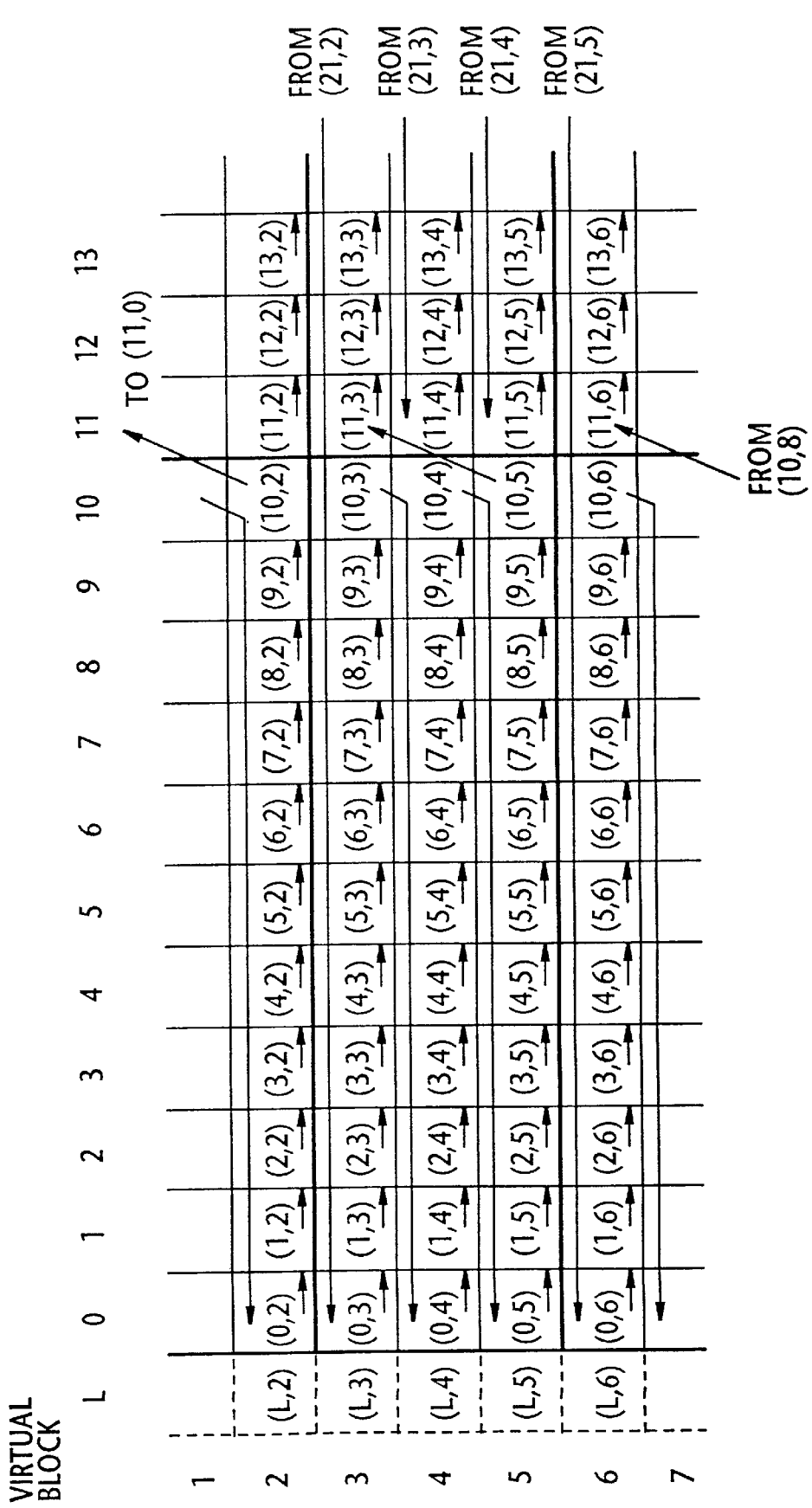
FIG. 7 is a diagram showing part of FIG. 6 wherein blocks are indicated by a pair of column and row numbers.

FIG. 7 is a diagram showing a part of FIG. 6 wherein blocks are indicated by a pair of column and row numbers. As mentioned in the opening paragraphs, the order of processing blocks are indicated by arrows.

It is assumed that in the first embodiment, one time slot has two operation stages. One time slot implies the time period during which one motion vector determination operation is completed. During one of the two stages, three reference blocks are written into one of the memory portions A0–A2 and B0–B2. During the other stage, the motion vector calculator accesses one of the banks A and B for motion vector determination. Further, during the above mentioned other stage, if necessary, three reference blocks are further written into one of the memory portions A0–A2 and B0–B2.

Figure 8:
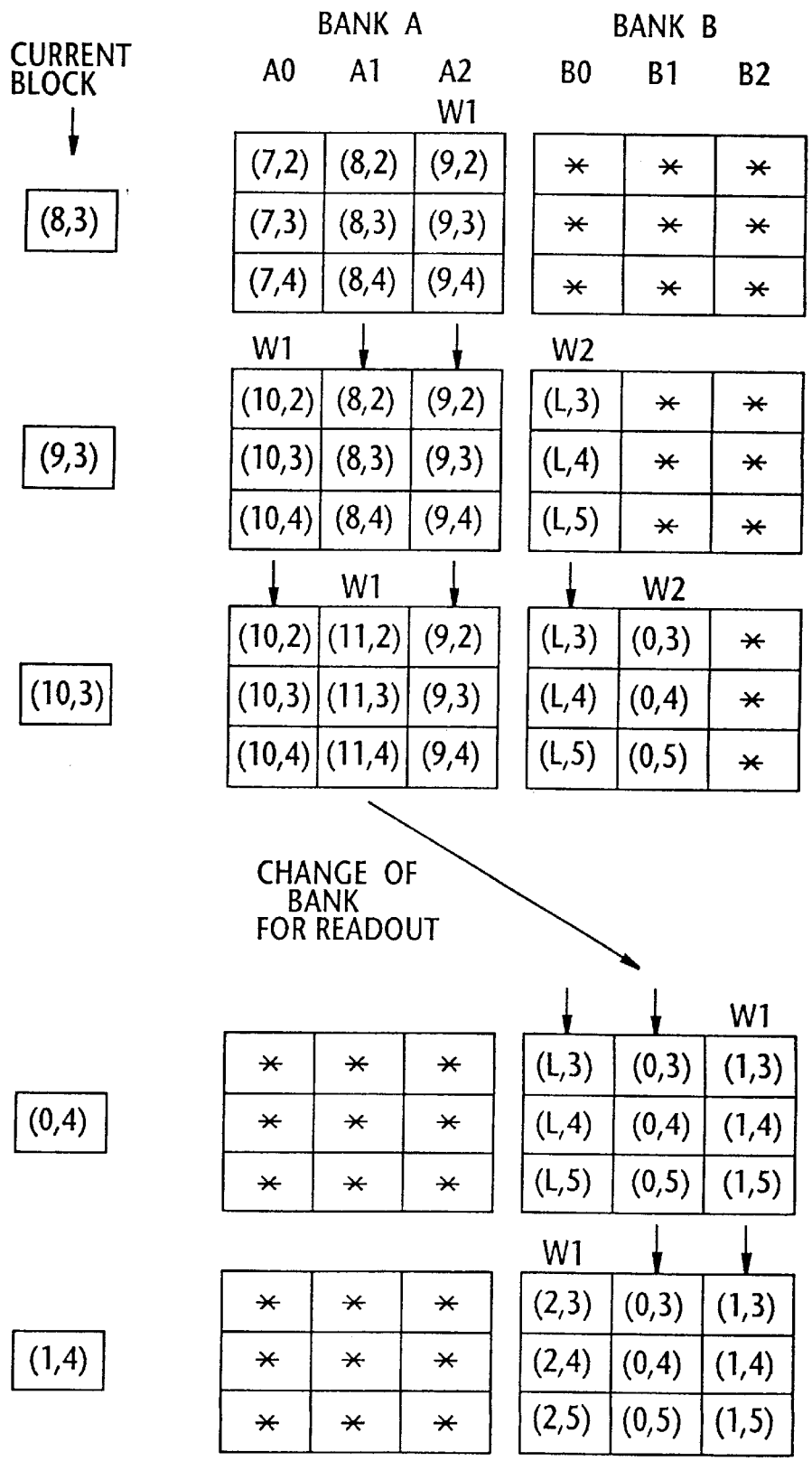
FIGS. 8 to 13 each is a diagram showing how to establish search windows for the respective current blocks in the first embodiment.

FIG. 8 is a diagram showing the current blocks (8,3), (9,3), (10,3), (0,4), and (1,4) which are successively stored in the current block memory 22 (FIG. 4) and further showing respective contents of the memory bank A and/or the memory bank B.

In FIG. 8, the memory portion including notation * implies that the data stored therein is not used. This is applicable to the other figures.

In FIG. 8, it is assumed that when the current block (8,3) is applied to the current block memory 22, the memory section A0 has already stored (7,2), (7,3), and (7,4) selected from the reference frame memory 26 (FIG. 4) while the memory section A1 has already stored (8,2), (8,3), and (8,4) selected from the reference frame memory 26 (FIG. 4).

During the first stage of a given time slot, the blocks (9,2), (9,3), and (9,4) are read out of the reference frame memory 26 (denoted by W1) and then stored in the memory section A2. Thus, the search window selected from the previous frame are stored in the search window memory 24. That is, the block (8,3) of the previous frame, which corresponds to the current block (8,3), is stored together with the neighboring blocks thereof in the search window memory 24. During the second stage of the time slot, the nine blocks stored in A0–A2 are accessed by the motion vector calculator 30. The current block (8,3) can be applied to the motion vector calculator 30 during either of the two stages of the time slot. As mentioned above, in the present invention, the operations of detecting motion vectors are irrelevant and thus the descriptions thereof will not be given for simplifying the disclosure.

Following this, the next current block (9,3) is applied to the current block memory 22. In this case, the memory sections A1 and A2 retain their contents as indicated by vertical arrows. During the first stage of the time slot which follows the time slot allocated to the motion vector determination in connection with the block (8,3), the blocks (10,2), (10,3), and (10,4) are read out of the reference frame memory 26 and stored in the memory section A0 (depicted by W1). Thus, the search window for the current block (9,3) is established. During the second stage of the instant time slot, the nine blocks in the bank A are accessed by the motion vector calculator 30. Further, during the second stage of the time slot, the virtual blocks (L,3), (L,4), and (L,5) are stored into the memory section B0 of the bank B (depicted by W2). As mentioned above, the current block (9,3) Can be applied to the motion vector calculator 30 during either of the first and second stages of the time slot.

Subsequently, the next current block (10,3) is applied to the current block memory 22. In this case, the memory sections A0 and A2 retain their contents. During the first stage of the time slot which follows the time slot allocated to the motion vector determination in connection with the block (9,3), the blocks (11,2), (11,3), and (11,4) are read out of the reference frame memory 26 and stored in the memory section A1 (depicted by W1). Thus, the search window for the current block (9,3) is established. During the second stage of the time slot, the nine blocks stored in the bank A are accessed by the motion vector calculator 30. Further, during the second stage, the blocks (0,3), (0,4), and (0,5) are stored into the memory section B1 (depicted by W2).

Following this, the next current block (0,4) is applied to the current block memory 22. In this case, the memory sections B0 and B1 retain their contents. During the first stage of the time slot which follows the time slot allocated to the motion vector determination in connection with the block (10,3), the blocks (1,3), (1,4), and (1,5) are stored in the memory section B2 (depicted by W1), whereby the search window for the current block (0,4) has been established. During the second stage of the time slot, the nine blocks stored in the bank B are accessed by the motion vector calculator 30. In this case, as mentioned above, the virtual blocks (L,3), (L,4), and (L,5) are ignored during the motion vector determination.

Subsequently, the following current block (1,4) is applied to the current block memory 22. In this case, the memory sections B1 and B2 retain their contents. During the first stage of this time slot, the blocks (2,3), (2,4), and (2,5) are stored in the memory section B2 (depicted by W1) from the reference frame memory 26. Thus, the search window for the current block (1,4) has been established. During the second stage of the time slot, the nine blocks stored in the bank B are accessed by the motion vector calculator 30 (viz., the change of bank from "A" to "B"). It will be understood that when a motion vector for the current block (0,5) is to be detected, another change of bank from "B" to "A" is carried out for motion vector determination by the motion vector calculator 30.

Thus, according to the first embodiment, the block which precedes the current block is stored in either or both of the banks A and B. Further, the change of bank is carried out when the current block, which is not adjacent to the preceding one, is to be processed for the motion vector determination.

Figure 9:
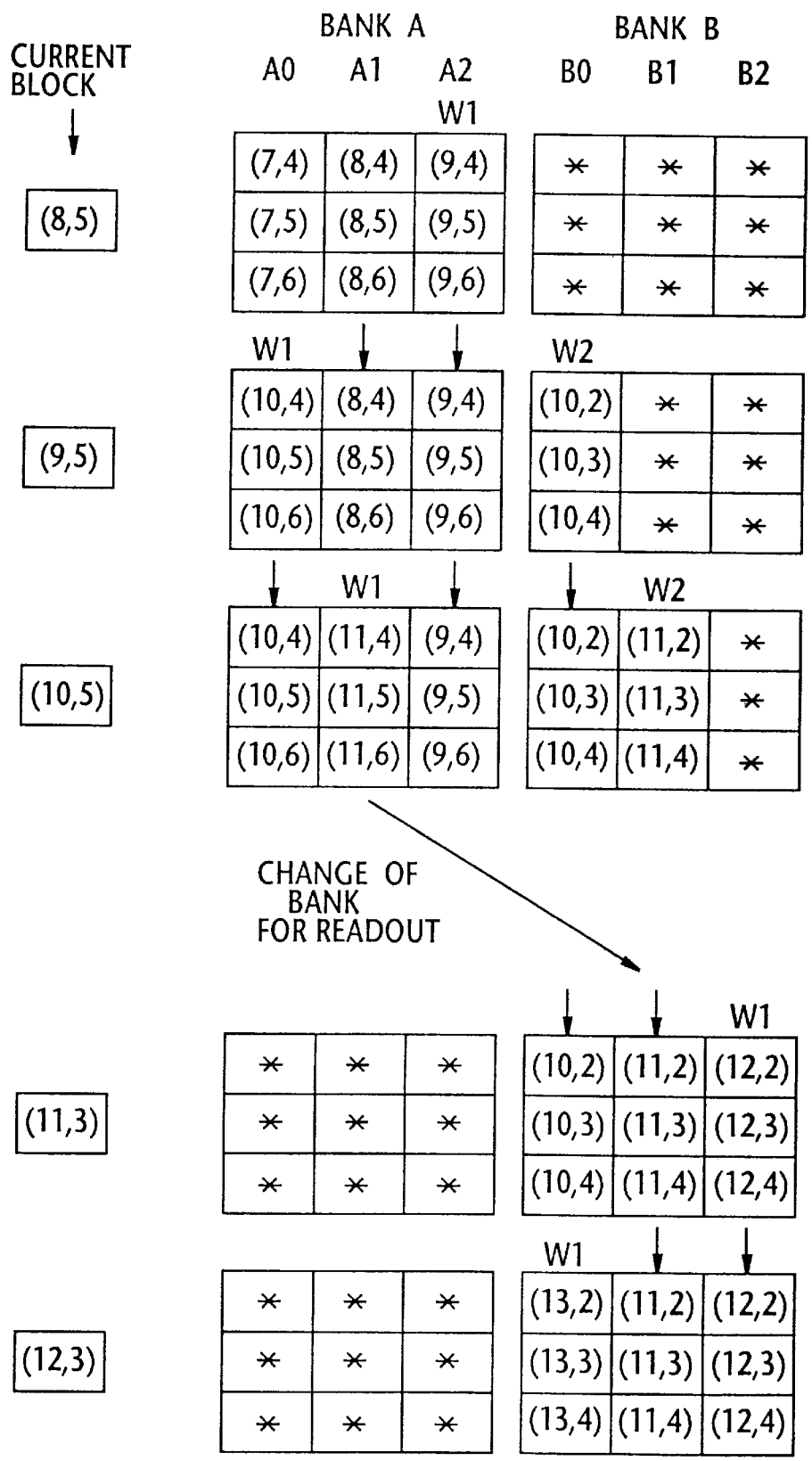

FIG. 9 is a diagram showing the current blocks (8,5), (9,5), (10,5), (11,3), and (12,3) which are successively stored in the current block memory 22 (FIG. 4) and further showing respective contents of the memory bank A and/or the memory bank B. The block write/read operations of FIG. 9 will readily be appreciated from the above discussion, and accordingly, the description thereof is omitted for brevity.

Figure 10:
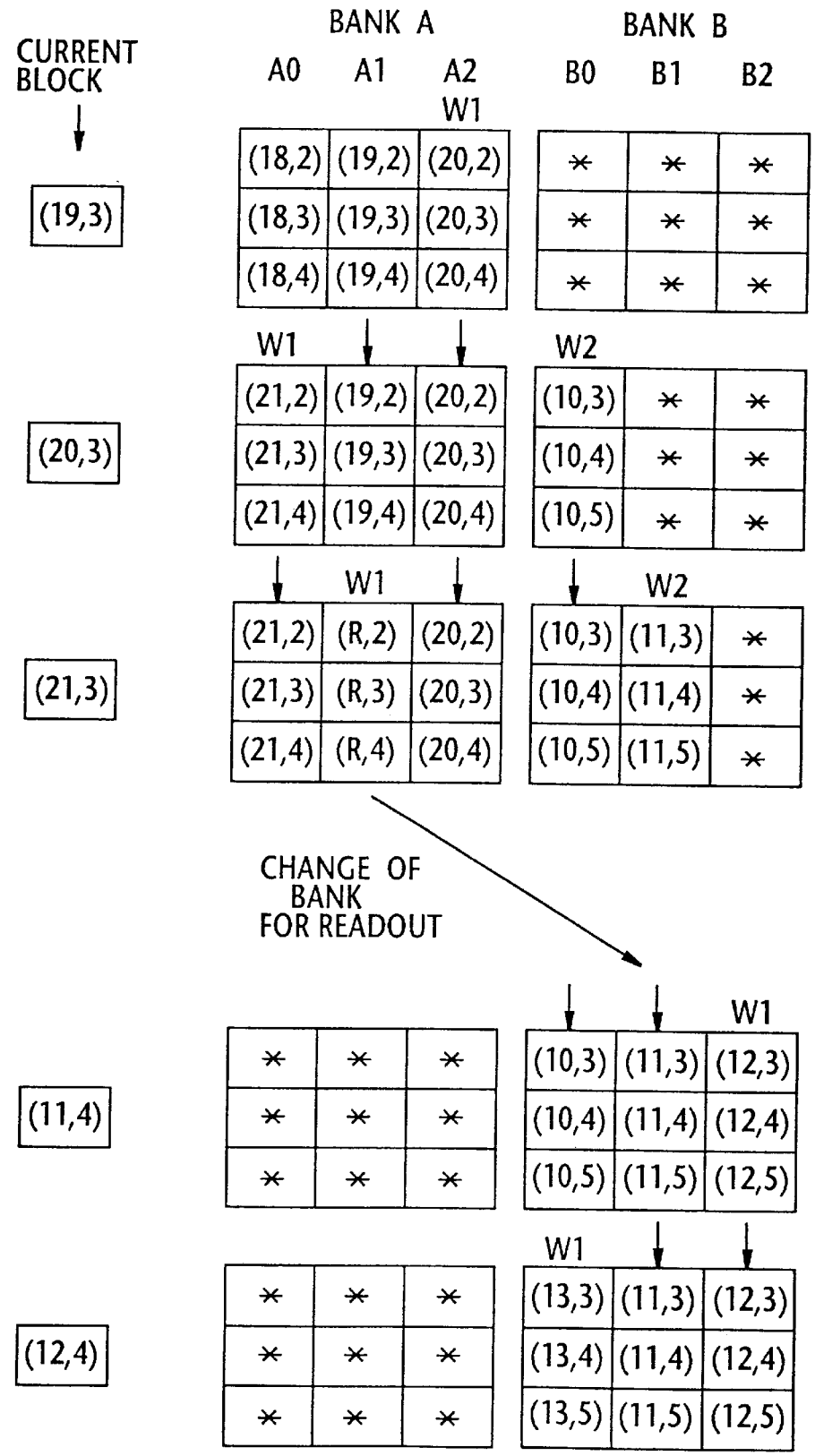

FIG. 10 is a diagram showing the current blocks (19,3), (20,3), (21,3), (11,4), and (12,4) (see FIG. 6) which are successively stored in the current block memory 22 (FIG. 4), and further showing respective contents of the memory bank A and/or the memory bank B. The block write/read operations of FIG. 10 will readily be appreciated from the above discussion, and accordingly, the description thereof in omitted for brevity.

Figure 11:
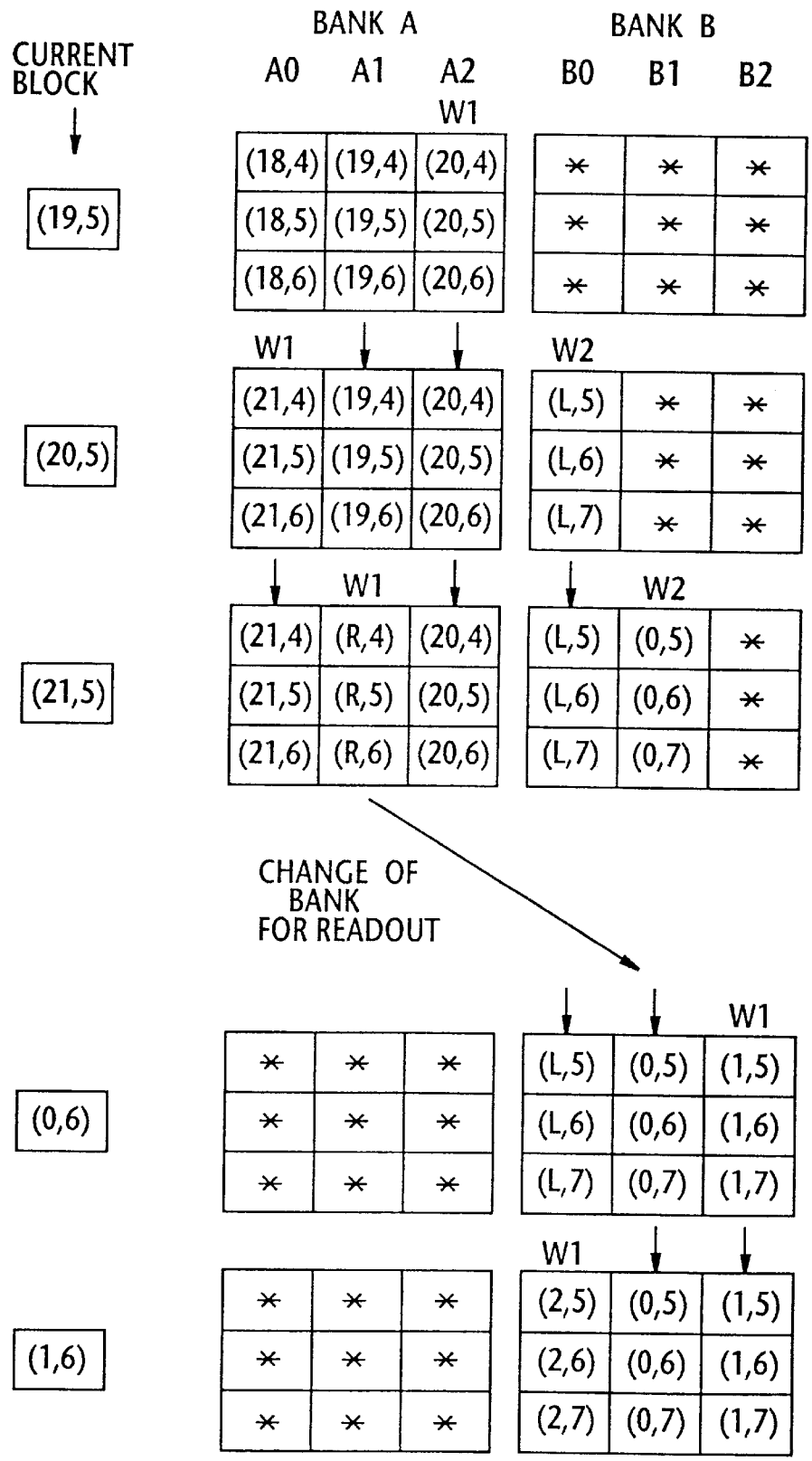

FIG. 11 in a diagram showing the current blocks (19,5), (20,5), (21,5), (0,6), and (1,6) (see FIG. 6) which are successively stored in the current block memory 22 (FIG. 4), and further showing respective contents of the memory bank A and/or the memory bank B. The block write/read operations of FIG. 11 will readily be appreciated from the above discussion, and accordingly, the description thereof is omitted for brevity.

Figure 12:
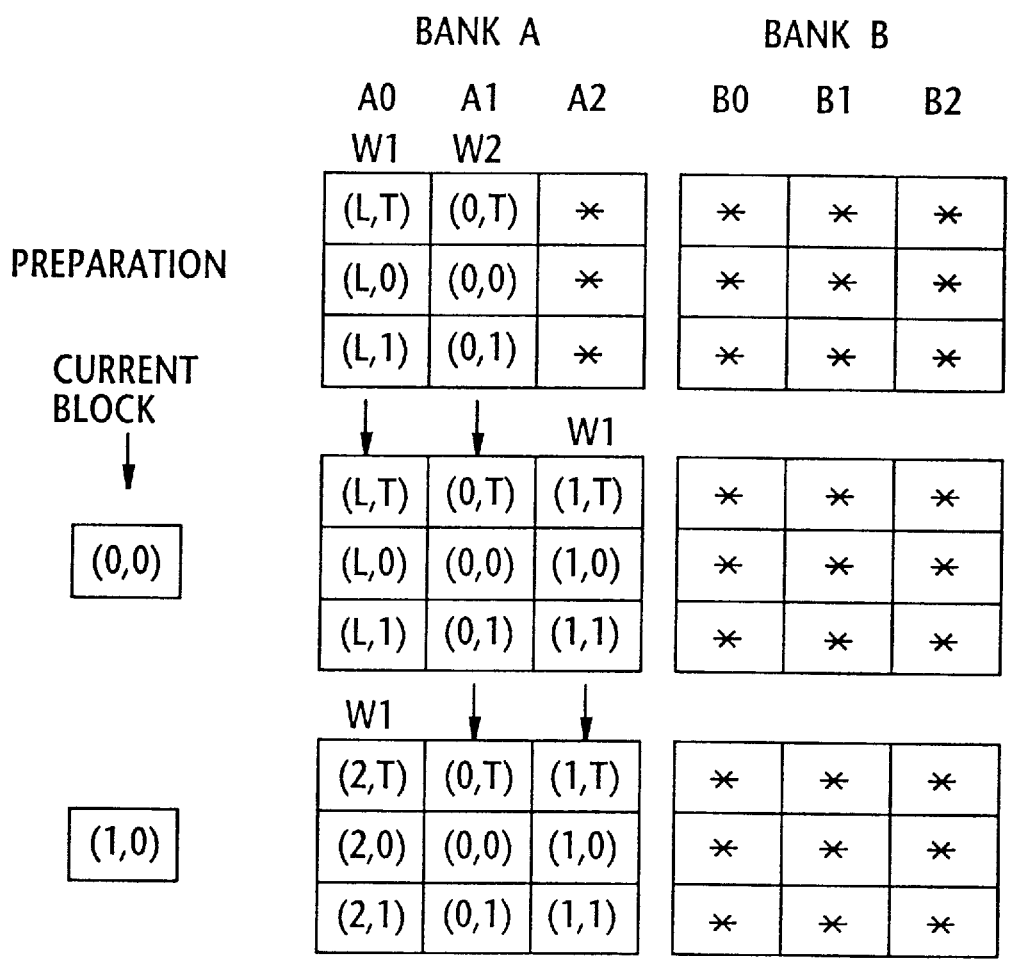

FIG. 12 is a diagram showing the first two current blocks (0,0) and (1,0) which are successively stored in the current block memory 22 (FIG. 4). Before the first block (0,0) of the picture frame is stored in the current block memory 22, the virtual blocks (L,T), (L,0), and (L,1) are stored in the memory section A0 while the virtual block (0,T) and the blocks (0,0) and (0,1) are store in the memory section A1. This is to create a search window when the block (0,0) is applied to the memory 22. The block write/read operations of FIG. 12 will readily be appreciated from the above discussion when referring to FIG. 6, and accordingly, the description thereof is omitted for brevity.

Figure 13:
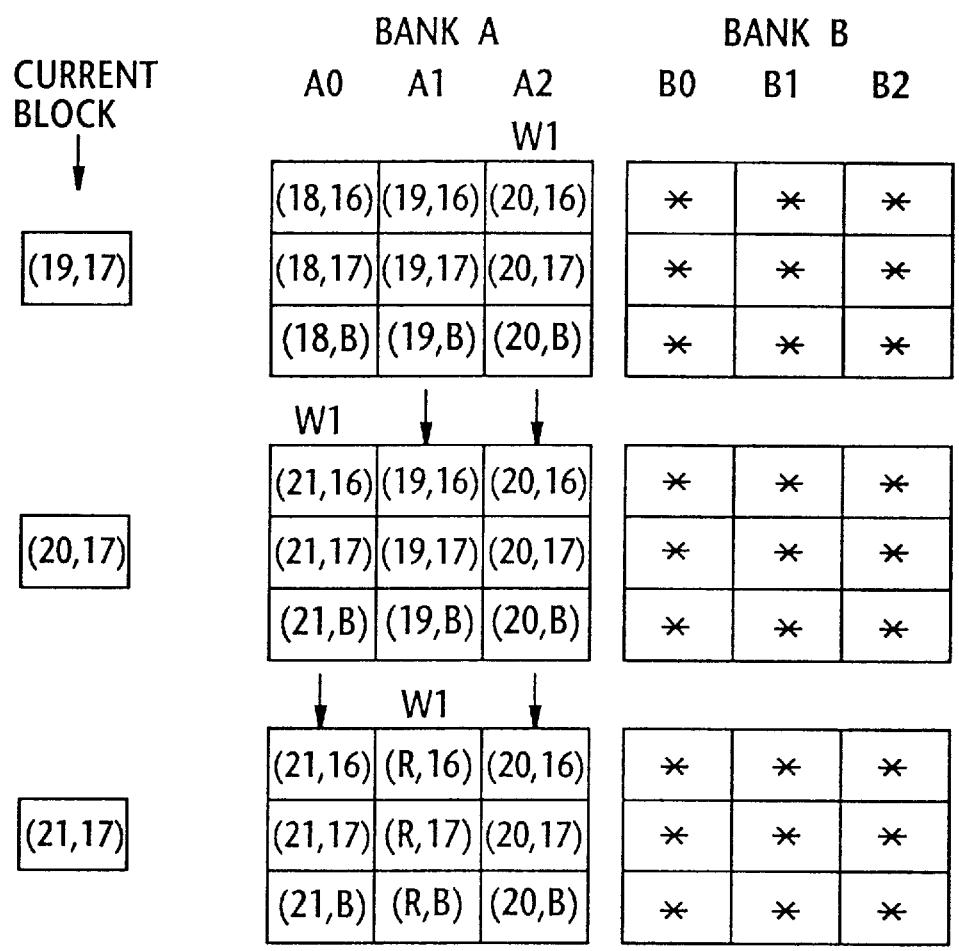

FIG. 13 is a diagram showing the last three current blocks (19,17), (20,17), and (21,17) which are successively stored in the current block memory 22 (FIG. 4), and further showing respective contents of the memory bank A. The block write/read operations of FIG. 13 will readily be appreciated from the above discussion when referring to FIG. 6, and accordingly, the description thereof is omitted for brevity.

In the above discussion, the virtual blocks are introduced and actually read from the reference frame memory 26 and then written into the search window memory 24. However, it is possible to skip the read/write operations of the virtual blocks in that the location of each virtual block can be specified during the operations. In such a case, the memory sections A0–A2 and B0–B2 store irrelevant blocks which are not required for motion vector determination. The motion vector calculator 30 can easily be modified such as to ignore these irrelevant blocks.

Figure 14:
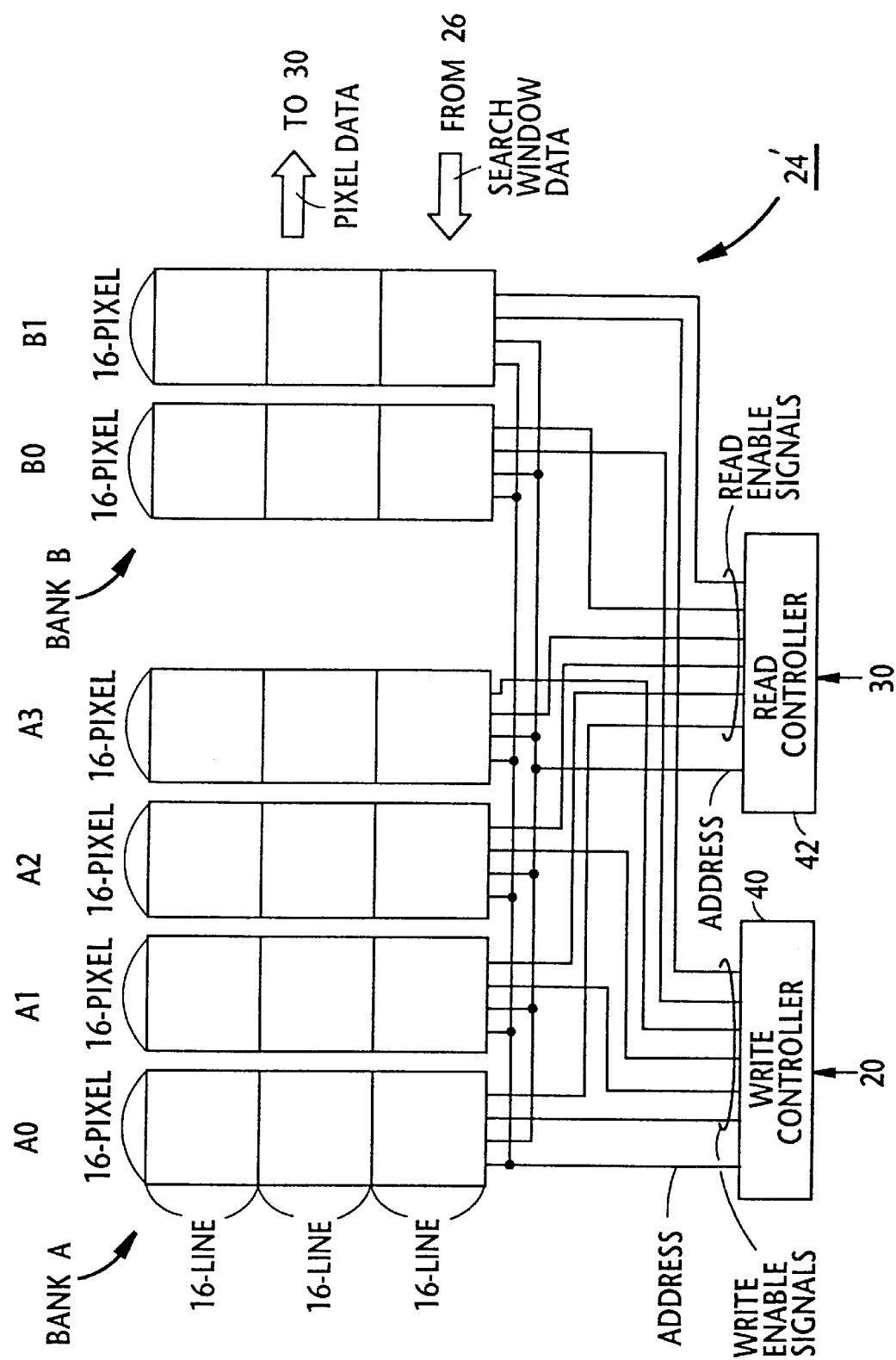
FIG. 14 is a block diagram showing details of one portion of FIG. 4, which is used for implementing a second embodiment of the present invention.

FIG. 14 is a block diagram showing the arrangement of the search window memory which is generally denoted by 24'. FIG. 14 is essentially identical to FIG. 5. The difference therebetween is that the memory sections B0, B1, and B2 of FIG. 5 are respectively labelled A3, B0, and B1.

A second embodiment of the present invention is described with reference to FIGS. 14 and 15.

The second embodiment is advantageous in the case where the operations speed is slow so that a search window can not be established and accessed by the motion vector calculator 30 within the same time slot as in the first embodiment. As a result, when a given current block is input to the current block memory 22 during a given time slot, the corresponding search window should already be prepared at the preceding current block processing.

Reference is made to FIG. 15, wherein the current blocks (7,5), (8,5), (9,5), (10,5), (11,3), and (12,3) are successively stored in the current block memory 22. As mentioned above, when the current block (7,5) is applied to the memory 22, the search window therefor has already been prepared. Thus, the search window which is formed by the data stored in the memory sections A1–A3 is read or accessed by the motion vector calculator 30. During the same time slot, the blocks (9,4), (9,5), and (9,6) are written into the search window memory 24 for establishing the next search window.

When the current block (8,5) is applied to the memory 22, the search window therefor has already been prepared and thus are ready to be accessed or read by the motion vector calculator 30. In this case, the blocks (10,4), (10,5), (10,6), (10,2), (10,3), and (10,4) are written into the search window memory 24.

In view of the above descriptions, the operations associated with the following current blocks (9,5), (10,5), (11,3), and (12,3) shown in FIG. 15 are understood without difficulty and thus, the further discussion of the second embodiment is omitted for simplifying the disclosure.

It will be understood that the above disclosure is representative of only two possible embodiments of the present invention and that the concept on which the invention is based is not specifically limited thereto.

What is claimed is:

1. A method of reading a plurality of macroblocks of a reference picture frame stored in a first memory and establishing a search window of N×N macroblocks within a second memory wherein N equals 3 or an odd integer greater than 3, said search window having a center macroblock corresponding to a current macroblock block of a current picture frame for implementing block matching between said center and current macroblocks, said reference picture frame being divided into rows and columns and partitioned into a plurality of groups of macroblocks (GOBs) which are successively processed in a predetermined order, the macroblocks of each GOB being successively processed from left to right and top to bottom along rows, said method comprising the steps of:

(a) providing said second memory with first and second memory banks each having memory capacity of N×N macroblocks;

(b) providing said reference picture frame with a plurality of virtual macroblocks at a periphery of said reference picture frame;

(c) writing 1×N macroblocks or 1×N virtual macroblocks from said first memory into said first memory bank so as to complete search windows each having a center macroblock on a given row;

(d) writing 1×N macroblocks or 1×N virtual macroblocks from said first memory into said second memory bank so as to prepare, while completing search windows in step (c), a search window whose center macroblock is an initial macroblock on a row immediately following said given row; and (e) writing 1×N macroblocks or 1×N virtual macroblocks from said first memory into said second memory bank so as to complete search windows each having a center macroblock on said row immediately following said given row.

2. A method as claimed in claim 1, wherein said 1×N macroblocks or 1×N virtual macroblocks are written into said first memory into said second memory banks in steps (c) and (d) at respective operating stages in one time slot.

3. A method as claimed in claim 2, wherein said search window is prepared in said second memory bank in step (d) when the center macroblock of each search window completed in step (c) is among said given row's last (N−1) macroblocks.

4. A method as claimed in claim 1, wherein said current macroblock is written into a third memory and wherein a motion vector calculator accesses said first memory bank and said third memory in step (c) while accessing said second memory bank and said third memory in step (e).

* * * * *